US009026993B2

(12) United States Patent
Duffy et al.

(10) Patent No.: US 9,026,993 B2
(45) Date of Patent: May 5, 2015

(54) IMMUTABLE TYPES IN IMPERITIVE LANGUAGE

(75) Inventors: John Duffy, Renton, WA (US); Anders Hejlsberg, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1208 days.

(21) Appl. No.: 12/163,868

(22) Filed: Jun. 27, 2008

(65) Prior Publication Data

US 2009/0327999 A1    Dec. 31, 2009

(51) Int. Cl.
*G06F 9/44*    (2006.01)

(52) U.S. Cl.
CPC .............. *G06F 9/4428* (2013.01); *G06F 8/315* (2013.01)

(58) Field of Classification Search
None
See application file for complete search history.

(56) References Cited

U.S. PATENT DOCUMENTS

| | | | |
|---|---|---|---|
| 5,075,845 A | 12/1991 | Lai et al. | |
| 5,175,851 A | 12/1992 | Johnson et al. | |
| 5,375,215 A | 12/1994 | Hanawa et al. | |
| 5,454,108 A | 9/1995 | Devarakonda et al. | |
| 5,459,871 A | 10/1995 | Van Den Berg | |
| 5,682,537 A | 10/1997 | Davies et al. | |
| 5,787,431 A | 7/1998 | Shaughnessy | |
| 6,009,269 A | 12/1999 | Burrows et al. | |
| 6,092,156 A | 7/2000 | Schibinger et al. | |
| 6,182,277 B1 | 1/2001 | DeGroot et al. | |
| 6,542,891 B1 | 4/2003 | Loen et al. | |
| 6,601,120 B1 | 7/2003 | Schimmel | |
| 6,604,109 B1 | 8/2003 | Federighi et al. | |
| 6,721,747 B2 | 4/2004 | Lipkin | |
| 6,810,363 B2 * | 10/2004 | Newman et al. | 702/187 |
| 6,817,009 B2 | 11/2004 | Flanagan et al. | |
| 6,925,638 B1 | 8/2005 | Koved et al. | |
| 7,013,469 B2 * | 3/2006 | Smith et al. | 719/328 |
| 7,058,655 B2 | 6/2006 | Goldberg et al. | |
| 7,086,065 B1 * | 8/2006 | Yeluripati et al. | 719/311 |
| 7,165,150 B2 | 1/2007 | Alverson et al. | |
| 7,188,344 B1 | 3/2007 | Blue | |
| 7,209,918 B2 | 4/2007 | Li | |
| 7,240,331 B2 | 7/2007 | Vion-Dury et al. | |
| 7,316,005 B2 | 1/2008 | Qadeer et al. | |
| 7,437,741 B2 * | 10/2008 | Crisan et al. | 719/330 |
| 7,469,403 B2 | 12/2008 | Choi et al. | |
| 8,032,859 B2 * | 10/2011 | Meijer et al. | 717/106 |
| 8,316,369 B2 | 11/2012 | Laksberg et al. | |

(Continued)

FOREIGN PATENT DOCUMENTS

| | | |
|---|---|---|
| CN | 101055518 | 10/2007 |
| CN | 101082866 | 12/2007 |

(Continued)

OTHER PUBLICATIONS

BEA "WebLogic Integration 2.1 documentation: Class SOMType", 2000, pp. 1-14, [online][retrieved on May 29, 2013]. Retrieved from <http://docs.oracle.com/cd/E13214_01/wlintegration/v2_1/classdocs/com/bea/schema/type/SOMType.html>.*

(Continued)

*Primary Examiner* — Li B Zhen
*Assistant Examiner* — Evral Bodden
(74) *Attorney, Agent, or Firm* — Kevin Sullivan; Aaron Hoff; Micky Minhas

(57) ABSTRACT

An imperative framework having a more than one type is defined. At least one of the types is an immutable type, and the immutable type has at least one immutable field.

20 Claims, 3 Drawing Sheets

(56) References Cited

U.S. PATENT DOCUMENTS

| | | | |
|---|---|---|---|
| 8,380,965 B2* | 2/2013 | Bouillet et al. | 712/220 |
| 8,495,329 B2 | 7/2013 | Duffy et al. | |
| 8,566,544 B2 | 10/2013 | Gustafsson et al. | |
| 2002/0107874 A1 | 8/2002 | DeLorme et al. | |
| 2003/0135576 A1 | 7/2003 | Bodin | |
| 2004/0205392 A1 | 10/2004 | Wu | |
| 2005/0108695 A1 | 5/2005 | Li et al. | |
| 2005/0149914 A1 | 7/2005 | Krapf et al. | |
| 2005/0198619 A1* | 9/2005 | Crisan et al. | 717/114 |
| 2006/0015528 A1 | 1/2006 | Hejlsberg et al. | |
| 2006/0156286 A1 | 7/2006 | Morgan et al. | |
| 2006/0248131 A1 | 11/2006 | Marwinski et al. | |
| 2007/0005658 A1 | 1/2007 | Myllymaki | |
| 2007/0078890 A1 | 4/2007 | Hsu et al. | |
| 2007/0130621 A1 | 6/2007 | Marinescu et al. | |
| 2007/0143335 A1 | 6/2007 | Antoch et al. | |
| 2007/0261043 A1 | 11/2007 | Ho et al. | |
| 2007/0282916 A1 | 12/2007 | Albahari et al. | |
| 2007/0288538 A1 | 12/2007 | Bacon et al. | |
| 2008/0077922 A1 | 3/2008 | Doring | |
| 2008/0162552 A1 | 7/2008 | Bonev et al. | |
| 2008/0163124 A1 | 7/2008 | Bonev et al. | |
| 2008/0209433 A1 | 8/2008 | McKenney | |
| 2008/0222602 A1* | 9/2008 | Vaziri-Farahani et al. | 717/116 |
| 2008/0313613 A1 | 12/2008 | Bierhoff et al. | |
| 2009/0138850 A1 | 5/2009 | Yamaoka | |
| 2009/0193417 A1 | 7/2009 | Kahlon | |
| 2009/0198899 A1 | 8/2009 | Revanuru | |
| 2009/0328047 A1 | 12/2009 | Li et al. | |
| 2010/0262801 A1 | 10/2010 | Duffy et al. | |
| 2010/0275191 A1 | 10/2010 | Duffy et al. | |
| 2011/0161604 A1 | 6/2011 | Laksberg et al. | |
| 2011/0161610 A1 | 6/2011 | Gustafsson et al. | |
| 2011/0161962 A1 | 6/2011 | Laksberg et al. | |
| 2014/0108438 A1 | 4/2014 | Duffy et al. | |

FOREIGN PATENT DOCUMENTS

| | | |
|---|---|---|
| KR | 1019980079611 | 11/1998 |
| WO | 0203198 | 1/2002 |
| WO | WO2005043388 A1 | 5/2005 |
| WO | 2006039239 | 4/2006 |

OTHER PUBLICATIONS

Prentice Hall "Visual C++® 2008: How to Program, Second Edition" by: P. J.Deitel & Associates, Dec. 31, 2007, p. 445.*

Tschantz, et al., "Javari: Adding Reference Immutability to Java", Proceedings of the 20th annual ACM SIGPLAN conference on Object oriented programming systems languages and applications, vol. 40, Issue 10 Oct. 2005, pp. 211-214.

Zibin, et al., "Object and Reference Immutability using Java Generics", Computer Science and Artificial Intelligence Laboratory Technical Report, Mar. 16, 2007, 14 pages.

Michael D. Ernst, "Annotations on Java Types", Nov. 12, 2007, pp. 1-34.

Jan Schafer, "Encapsulation and Specification of Object-Oriented Runtime Components", Sep. 30, 2004, 89 pages.

Artzi, et al., "Combined Static and Dynamic Mutability Analysis", Computer Science and Artificial Intelligence Laboratory Technical Report, Mar. 23, 2007, 19 pages.

"International Search Report & Written Opinion for PCT Patent Application No. PCT/US2013/065139", Mailed Date: Jan. 30, 2014, Filed Date: Oct. 15, 2013, 8 Pages.

Stasenko, Igor, "Re: [squeak-dev] Re: The solution of (Was: Creating An Image From First Principles)", retrieved at http://www.nabble.com/Re:—squeak-dev—Re:-The-solution-of-(Was:-Creating-an-image-from-first-principles)- p18860090.html, Aug. 7, 2008, pp. 3.

Garg, et al., "Type-Directed Concurrency", retrieved at <<http://citeseerx.ist.psu.edu/viewdoc/summary? doi=10.1.1.61.1659>>, pp. 1-15. Aug. 2005.

Aditya, et al., "A Type System for Functional Imperative Programming (Technical Summary)", retrieved at <<http:// csg.csail.mit.edu/pubs/memos/Memo-368/memo-368.pdf>>, Jul. 1994, pp. 19.

Gifford, et al., "Integrating Functional and Imperative Programming", retrieved at <<http://delivery.acm.org/10.1145/320000/319848/p28-gifford.pdf? key1=319848&key2=3891481321&coll=GUIDE&dl=GUIDE&CFID=17666327&CFTOKEN=64628890>>, ACM, 1986, pp. 28-38.

Beckman, Nels E., "Verifying Correct Usage of Atomic Blocks using Access Permissions", retrieved at <<http://www.cse.unl.edu/-grother/isstadoc-papers/beckman.pdf>>, pp. 4. Oct. 23, 2008.

Flanagan, et al., Types for Safe Locking, retrieved at <<http://citeseerx.ist.psu.edu/viewdoc/summary? doi=10.1.1.36.849, pp. 18. Oct. 16, 2009.

The Office Action for U.S. Appl. No. 12/429,874 mailed Mar. 29, 2012 (19 pgs).

The International Preliminary Report on Patentability for International Application No. PCT/US2010/029716 mailed Oct. 27, 2011 (6 pages).

The Final Office Action for U.S. Appl. No. 12/429,874 mailed Oct. 26, 2012 (21 pgs).

Yi Lu and John Potter, "On Ownership and Accessibility" 2006, Springer-Verlag Berlin Heidelberg, 25 Pages.

The Office Action for U.S. Appl. No. 12/429,874 mailed Jan. 31, 2014 (22 pgs).

Boyapati et al.,"Ownership Types for Object Encapsulation," Jan 15-17 2003, 11 pages.

The International Search Report, Mailed Date: Nov. 4, 2010, Application No. PCT/US2010/029716, Filed Date: Apr. 1, 2010, pp. 6.

The Written Opinion, Mailed Date: Nov. 4, 2010, Application No. PCT/US2010/029716, Filed Date: Apr. 1, 2010, pp. 4.

The Office Action for U.S. Appl. No. 12/422,764 mailed Aug. 1, 2011 (20 pgs).

The Final Office Action for U.S. Appl. No. 12/422,764 mailed Dec. 15, 2011 (15 pgs).

The Office Action for U.S. Appl. No. 12/422,764 mailed Oct. 25, 2012 (18 pgs).

Zibin, Yoav et al., "Object and Reference Immutability Using Java Generics," Proceedings of the 6th Joint Meeting of the European Software Engineering Conference and the ACM Sigsoft Symposium on the Foundations of Software Engineering, pp. 10 (Jan. 2007).

The Supplemental European Search Report for Application No. EP 10 76 4898 mailed Dec. 18, 2012 (9 pgs).

The Notice of Allowance for U.S. Appl. No. 12/422,764 mailed Mar. 18, 2013 (10 pgs).

First Office Action received in China Patent Application No. 201 080017093.9, Mailed Date: Nov. 4, 2013, Filed Date: Apr. 1,2010, 14 Pages.

Bierhoff, et al., "Modular Typestate Checking of Aliased Objects", in Proceedings of the 22nd Annual ACM 2 SIGPLAN Conference on Object-oriented Programming Systems and Applications, vol. 42, Issue 10, Oct. 25, 2007, pp. 301-320.

Office Action Received in European Patent Application No. 10764898.2, Mailed Date: Feb. 3, 2014, Filed Date: Apr. 1, 2010, 5 Pages.

Colin S. Gordon, et. al., "Uniqueness and Reference Immutability for Safe Parallelism", University of Washington, US 20 pages, (Oct. 19-26, 2012).

The Office Action dated Jun. 20, 2013 cited in U.S. Appl. No. 12/649,255.

The Notice of Allowance for U.S. Appl. No. 12/649,252 mailed Jun. 24, 2013 (13 pages).

The Office Action dated Apr. 10, 2012 cited in U.S. Appl. No. 12/649,254.

The Notice of Allowance dated Aug. 8, 2012 cited in U.S. Appl. No. 12/649,254.

The Office Action for U.S. Appl. No. 12/649,252 mailed Mar. 4, 2013 (9 pages).

Thought Exercise: Axum + F#: Isolation, Agents, and Message-passing in .Net—Published Date: Mar. 31, 2009 http://blogs.msdn.com/maestroteam/ (26 pages).

(56) References Cited

OTHER PUBLICATIONS

Stork et al., Concurrency by Default Using Permissions to Express Dataflow in Stateful Programs—Published Date: Oct. 25-29, 2009 http://www.cs.cmu.edu/-aldrich/papers/onward2009-concurrency.pdf (8 pages).

Isolation in Maestro: Isolation, Agents, and Message-passing in .Net—Published Date: 2009 http://blogs.msdn.com/maestroteam/archive/2009/02/27/isolation-in-maestro.aspx (7 pages).

Axum, Microsoft's Approach to Parallelism—Published Date: Apr. 23, 2009 http://www.infoq.com/news/2009/04/Axum (2 pages).

Greenhouse et al, Assuring and Evolving Concurrent Programs: Annotations and Policy—Published Date: May 19-25, 2002http://fluid.cs.cmu.edu:8080/Fluid/fluid-publications/p453-greenhouse.pdf (11 pages).

Taming Your Sequence's Side-Effects through lEnumerable.Let—Published Date: Sep. 12, 2009 http://bartdesmet.net/blogs/bart/archive/2009/09/12/taming-your-sequence-s-side-effects-through-ienumerable-let.aspx (20 pages).

Kieburtz, Taming Effects with Monadic Typing1—Published Date: 1998 http://delivery.acm.org/10.1145/290000/289428/p51-kieburtz.pdf? key1=28942&key2=9659755521&coll=GUIDE&dl=GUIDE&CFID=56555689&CFTOKEN=92779120 (12 pages).

Andrade et al., Software Synthesis from Dataflow Models for G and LabVIEW—Published Date Mar. 16, 1998 http://users.ece.utexas.edu/—bevans/courses/ee382c/projects/spring98/andrade-kovner/litsurvey.pdf (9 pages).

Ha et al., Compile-Time Scheduling of Dynamic Constructs in Dataflow Program Graphs, IEEE Transactions of Computers, vol. 46, No. 7, Published Date: Jul. 1997 http://ptolemy.eecs.berkeley.edu/publications/papers/97/ compile/compile.pdf (12 pages).

Munnich, PRED-DF—A Data Flow Based Semantic Concurrency Control Protocol for Real-Time Main-Memory Database Systems—Published Date: 2000 http://ieeexplore.ieee.org/stamp/stamp.jsp?tp=&arnumber=896428&isnumber=19358 (5 pages).

Cox et al., Adding Parallelism to Visual Data Flow Programs—Published Date—2005 http://users.cs.dal.ca/~arc/publications/2-36/paper.pdf (10 pages).

Templ et al., Lock-Free Synchronization of Date Flow between Time-Triggered and Event-Triggered Activities in a Dependable Real-Time System—Retrieved Date: Oct, 14, 2009 http://embeddedcmmi.at/fileadmin/src/docs/ publications/C088.pdf (6 pages).

Leung et al., Data Race: Tame the Beast,—Published Date 2009 http://www.cs.otago.ac.nz/research/publications/oucs-2009-01.pdf (11 pages).

Nienaltowski, Efficient Data Race and Deadlock Prevention in Concurrent Object-Oriented Programs—Published Date: 2004 http://se.inf.ethz.ch/people/nienaltowski/papers/oopsla04.pdf (2 pages).

Boyapati, et al., "Ownership Types for Safe Programming: Preventing Data Races and Deadlocks", retrieved at <<http://www.eecs.umich.edu/~bchandra/publications/oopsla02.pdf>>, ACM Conference on Object-Oriented Programming, Systems, Languages and Applications (OOPSLA), Nov. 2002, pp. 211-230.

The Office Action for U.S. Appl. No. 13/652,436 mailed Oct. 3, 2014 (22 pages).

* cited by examiner

IMMUTABLE TYPES IN IMPERITIVE LANGUAGE

BACKGROUND

Imperative programming is a computer programming paradigm that describes computation as a series of statements that change a program state. Imperative programming can be contrasted with functional programming, which avoids state and mutable data. For example, purely functional programs have no side effects, which are modifications of some state while returning a value. On the other hand, a purely functional program can do nothing because without side effects a program accepts no input, produces no output, and does not interface with external devices. Imperative programming uses side effects to implement state and input/output functions. Accordingly, many programmers and software development engineers are most familiar with imperative programming and often these programmers take for granted that data structures change over time.

Mutability was less of a concern in programming for single processor architectures. Mutability is a challenge, however, in the now ubiquitous concurrent (such as multiprocessor or parallel) processing architectures. Adding immutability to existing imperative, or mutability-oriented, programming languages such as C++, C#, Visual Basic, and Java, can simplify imperative programming in concurrent architectures. A major difficulty in building concurrent systems today is related to how an imperative system approaches ever-changing states.

Many programmers attempt to address the issue of mutability through the creation of "locks" of the state, and synchronization to control concurrent reads and writes of states. Locks are used on an object when the program only desires to inspect a state to avoid changing the state during inspection. Locks and synchronization lead to recursive lock acquisitions, deadlocks, additional overhead, and other undesireable affects. Further, locks and synchronization can create related problems such as races.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

In one embodiment, an imperative framework having more than one type is defined. At least one of the types is an immutable type, and the immutable type has at least one immutable field.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is also to be understood that features of the various exemplary embodiments described herein may be combined with each other, unless specifically noted otherwise.

Figure 1:
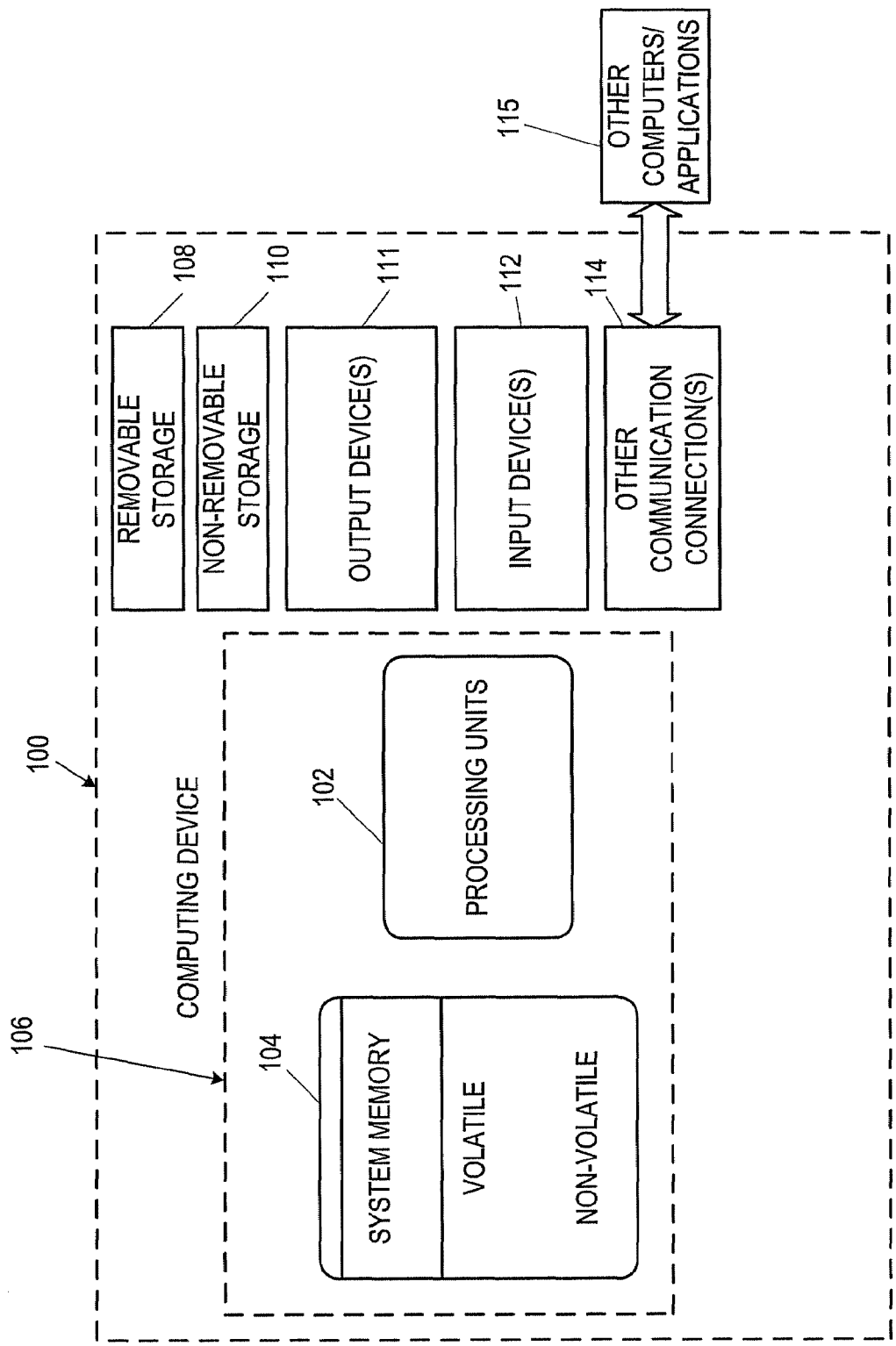
FIG. 1 is a block diagram illustrating an example computing system.

FIG. 1 illustrates an exemplary computer system that can be employed as an operating environment includes a computing device, such as computing device 100. In a basic configuration, computing device 100 typically includes a processor architecture having at least two processing units, i.e., processors 102, and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a person computer, a server, a handheld device, a consumer electronic device (such as an video game console), or other.

Computing device 100 can also have additional features/functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

The computing system 100 can be configured to run an operating system software program and one or more software applications, which make up a system platform. In one example, the computing system 100 includes a software component referred to as a managed environment. The managed environment can be included as part of the operating system or can be included later as a software download. The managed environment typically includes pre-coded solutions to common programming problems to aid software developers to create software programs such as applications to run in the managed environment, and it also typically includes a virtual machine that allows the software applications to run in the managed environment so that the programmers need not consider the capabilities of the specific processors 102.

Figure 2:
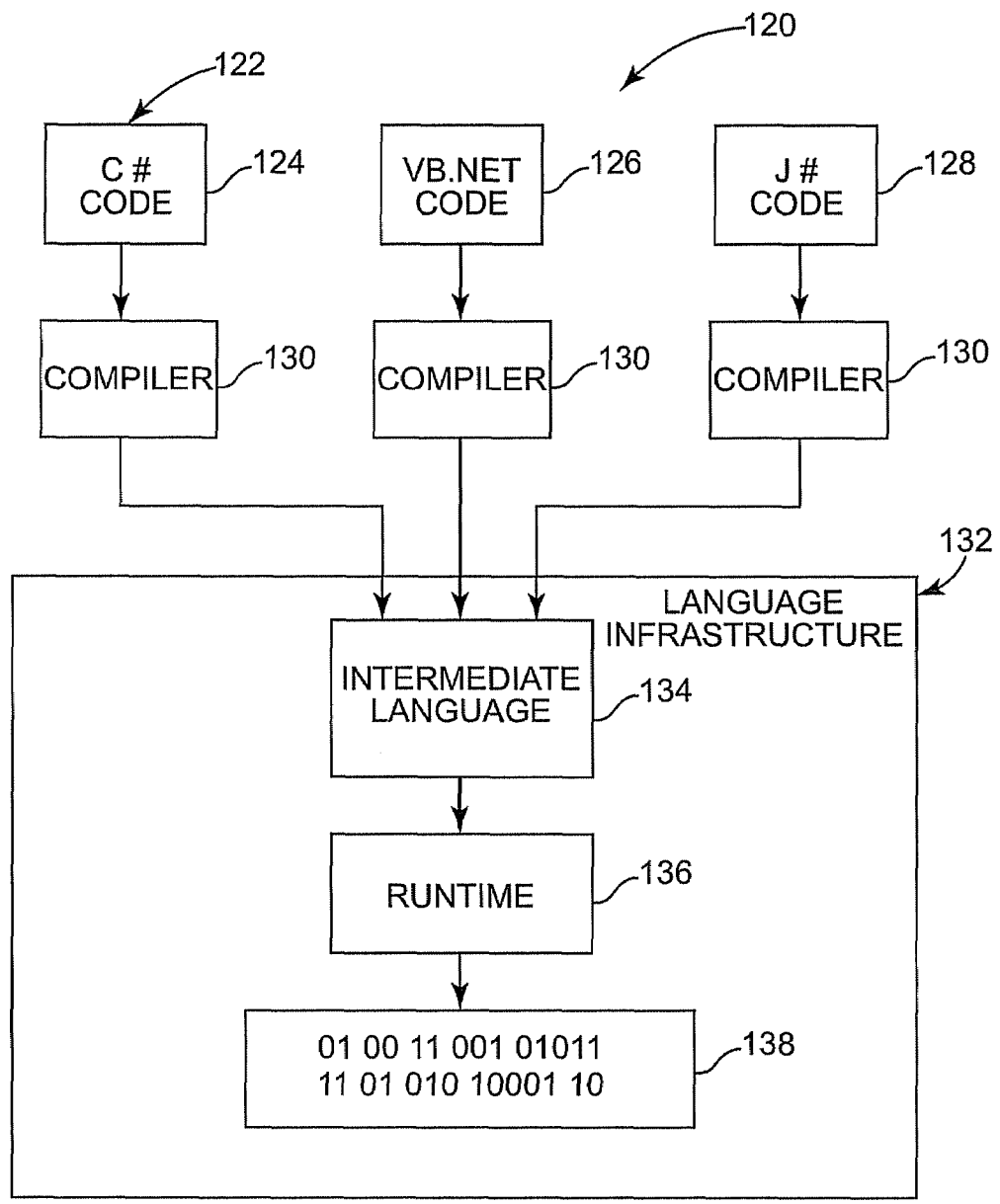
FIG. 2 is a block diagram illustrating one example of a managed environment operating on the computing system of FIG. 1

FIG. 2 illustrates an example managed environment 120 suitable for operation with the computing device 100. Particular current examples of managed environments include Microsoft .NET framework, Java framework, or other commercial or user-specific varieties of managed environments. The managed environment 120 is configured to accept programs written in a high-level compatible code of one or more programming languages 122. For example, the managed environment can accept programs written in C type programming language such as C# code 124, a visual basic type language such as VB.NET code 126, and a Java type language such as J# 128. Compilers 130 are configured to compile each compatible code 124, 126, 128. The compiled code can be provided to an infrastructure 132 that describes an executable code and a runtime environment that describes a number of runtimes. An example of an infrastructure is Common Language Infrastructure (CLI). The infrastructure includes a second compiler 134 that receives the compatible languages and compiles them to a second and platform neutral intermediate language, such as Common Intermediate Language (CIL). The intermediate language is provided to another compiler 136 that compiles the intermediate language to a machine readable code 138 that can be executed on the current platform or computing device.

The hardware implementation of computing device 100 is imperative and is designed to execute machine readable code 138, written in an imperative style. Imperative programming is known in the art as a programming paradigm that describes computation as statements that change a program state. For example, imperative programs are a sequence of commands for the computer to perform. The program state is defined by the contents of memory, such as memory 104, and the statements are instructions in the native machine language 138 of the computing device 100. Higher-level imperative languages, such as the C# 124, VB.NET 126, and J# 128 use variables and more complex statements, but still follow the same paradigm.

Mutable types are prevalent in imperative programming languages, and a mutable type is one where instances can change over time. In contrast, an immutable type is one where post-construction changes are not possible. One example used to establish an immutable type in an imperative language is the creation of support for "initonly" fields. Initonly indicates that variable assignment can only occur as part of the declaration or in a static constructor in the same class. An initonly field is one which is not written to once the object on which that field resides has been fully constructed. In this context, fully constructed means the constructer of the object has finished executing. Imperative languages can include a type system support that verifies this property, and reject programs that do not adhere to the rules. In C#, support for initonly fields includes readonly. In an example illustration of initonly, the program can only read a copy, and can not access the pointer (address) so that every operation is performed on the copy.

Based on initonly and the presence of the type system verification, several rules can be put in place. An example is an immutable attribute to be applied to types. In fictional C# syntax:

```
public immutable class String {
    ...
}
```

In this example syntax, the instances of String, once created, will never change. Annotating a type with an immutable attribute indicates that the objects of that type are immutable. The type could be subject to rules or restriction.

An example rule is where [Rule 1] "Fields of immutable types are initonly," such as the readonly keyword in C#. As an example, applying this to the String type being created as above provides:

```
public immutable class String {
    public readonly int Length;
    public readonly LinkedList<char> Chars;
    ...
}
```

These fields are assigned to in the constructor of the program, as per initonly rules. As such Rule 1 provides for a first level of immutability takes advantage of type system and language support for initonly fields.

Another example rule is where [Rule 2] "The types used as fields in an immutable type are also immutable." Rule 2 provides for transitivity, i.e., transitive immutability, or another level of immutability under the level of Rule 1. Applying Rule 2 to the example above, the String only references type which the state also does not change after the String has been constructed, e.g. int and LinkedList<char>. The types are initialized to have been fully completed in the constructor of String. For example:

```
public immutable class String {
    public readonly int Length;
    public readonly LinkedList<char> Chars;
    public String(char[ ] chars {
        Length = chars.Length;
        Chars = Make9chars, c);
    }
    private LinkedList,T> Make(char[ ] chars, int c {
        if (c>= chars.Length) return null;
        return new LinkedList<T>(chars[c], Make(chars, c+1));
    }
}
Immutable class LinkedList<T> {
    internal readonly T value;
    internal readonly LinkedList<T> next;
    internal LinkedList(T value, LinkedList<T> next) {
        this.value = value; this.next =next;
    }
}
```

The mutability of a complex object is often but not always, comprised of its own field and also the state in the objects it refers to. Rules 1 and 2 cover a vast majority of immutable situations.

One extension of Rule 2 provides that [Rule 3] "Immutable types should not derive from mutable types." In practice, this rule is perhaps stronger than needed, but it is effective. A policy behind this rule is that the immutability of a derived type is not affected with mutations in the base type. A related extension of Rule 2 can be achieved with a rule that relaxes the conditions of Rule 3 where [Rule 3a] "An immutable type does not override any virtual members and does not access fields from a base type." In another example, Rule 3 can be relaxed in cases of certain immutability transparent types. These are types that are not immutable, e.g., the type does not require that all subclasses are immutable, but they do not have observable immutability. Therefore, they can be suitable of which to base off immutable types. Accordingly, Rule 3b can be "Base types can be immutability transparent such as objects." Two examples in the current type system are System.Object and System.VaueType available from Microsoft Corp.

Another extension of Rule 2, and related to Rules 3, 3a, or 3b is [Rule 4] "Mutable types should not derive from immutable types." A mutable type that can derive from an immutable type could override behavior in such a way that the base type appears to have become mutable. This could be the case if a virtual method on an immutable base type is overridden to add mutability. This can appear deceptive even if fields of the base type have not been modified because the behavior was accessed through a virtual member of the immutable type. In one example, the public immutable types are sealed to prevent outside classes that do not abide by the immutability analysis from breaking up code that relies on a given type being immutable. In another example, virtual members are eliminated.

Rule 5 provides that "Immutable types can not share 'this' reference during construction." Although it is considered undesirable programming practice, the 'this' references is accessible to a constructor and all of the code it calls, and can thus be published to other threads before construction is complete. If this would happen for an immutable object, other threads may observe it an entirely invalid state thus breaking several assumptions that an immutable type in an imperative language seeks to set out. As an example, another thread may read the fields of an object before the fields have been initialized, and this would cause issues with establishing immutability.

Verification of Rule 5 is difficult for a system where all code called from a constructor is statically known and can be analyzed; although it is still possible to verify. In other systems, such as the .NET framework, over-conservative restrictions can be placed on the code callable during construction. In general, these restrictions can include (1) Code can be analyzed for stores of the 'this' reference, which can be made illegal.

(2) Code can be analyzed for aliasing the 'this' reference. This can be made legal, but if alias analysis is unable to track a reference for any reason, it can be made illegal.

(3) Static method calls made from the constructor can be traced recursively and checked.

(4) Dynamic method calls, such as function pointer delegate or virtual method can be made illegal.

Object reference published prior to the initialization of its fields can also devolve into the problems mentioned with regard to Rule 5. Therefore, the writing of a reference to an immutable object can imply a store-release barrier in the memory module. Accordingly, [Rule 6] provides for "Publication of a immutable objects implies a memory module barrier." The memory of .NET 2.0 from Microsoft Corp. provides for this by default, but managed environments, such as Java Memory Module from Sun Microsystems and the ECMA .NET (standardized by Ecma International) memory module, do not include this feature. In these cases, extra compiler support can be provided to safeguard against publication prior to the initialization of fields.

In cases where transitive immutability is not needed, the rules can be relaxed even further. For example, [Rule 7] provides that "Fields may be immutable if transitive immutability is not needed." For example, a list can refer to the individual elements, but does not need to mutate them. It is illegal, however, for the list to accept a comparer that can cast the elements and mutate them. Although irregular and technically illegal, some mutable fields can be used as an optimization technique that also provides the appearance of semantic provider of immutability. For example, an array of chars in the String type above can be used because a linked list incurs much space overhead for each character. Mechanisms such as a mutable field modifier can be provided as long as the characters are not mutated in such a way that users of the String class can observe the mutability.

Still further, [Rule 8] provides "Generic type constraints can specify immutability." The language support can also provide for generic constraints that indicate the only suitability type arguments are either immutable or mutable. For example, for an immutable list to have a safe comparer, the element type arguments of the list can be constrained to immutable types, such as with the syntax:

class ImmutableList<T> where T is immutable { ... }

Figure 3:
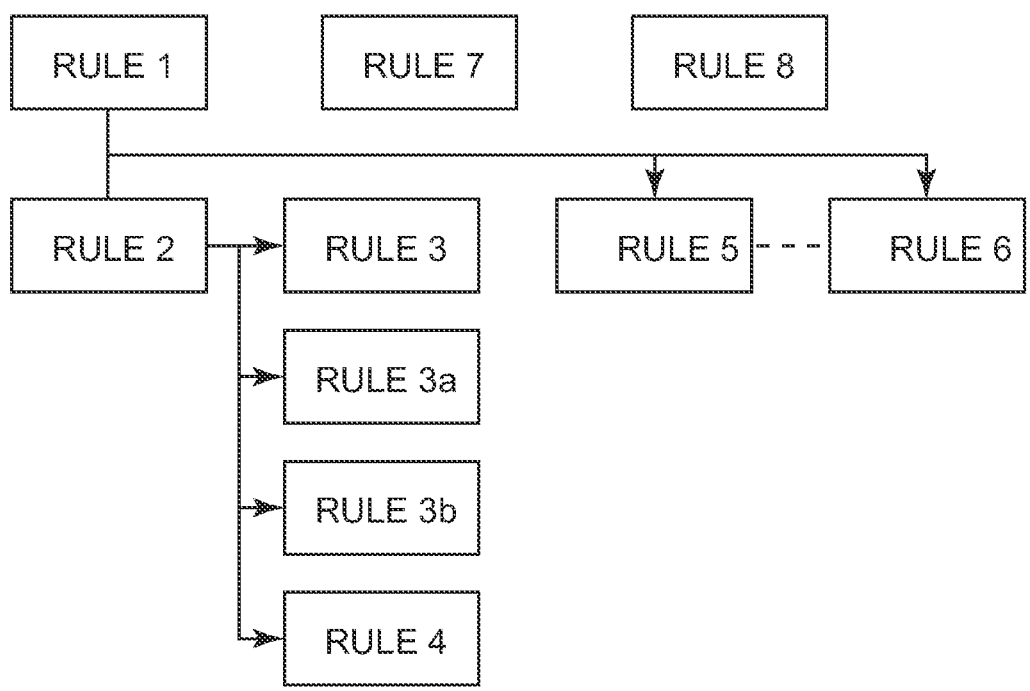
FIG. 3 is a block diagram illustrating an example map of rules that can be applied to the managed environment of FIG. 2.

FIG. 3 illustrates a map of the rules 1-8 above. Rules 1, 7 and 8 relate to a level of immutability. Rules 2 and 3, 3a, or 3b, and 4-6 relate to a deeper level of transitive immutability compared to Rule 1. Rules 3, 3a or 3b, and also rule 4 derive from Rule 2. Also, the problems addressed in Rule 5 could devolve into problems addressed in rule 6.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A computer memory storing computer executable instructions for controlling a computing device to perform a method comprising:

defining an imperative framework having a plurality of types;

defining at least one of the plurality of types within the imperative framework as an immutable type wherein all post-construction changes to objects of the immutable type is not possible, and wherein the immutable type includes at least one immutable field; and verifying the immutable type within the imperative framework with a plurality of rules including:

variable assignments of fields of the immutable type are initonly and only occur as part of a declaration or in a static constructor of the same class;

types used as fields in the immutable type are also immutable such that immutable types do not derive from mutable types wherein the immutability of a derived type is not affected with mutations of the base type, subjected to the conditions of, the immutable type does not override virtual members and does not access fields from a base type, and base types can be immutability transparent;

mutable types do not derive from immutable types; and
immutable types do not share a 'this' reference during construction verified by at least one of:
stores and aliasing of the 'this' reference are declared illegal,
analyzing code for aliasing of the 'this' reference,
recursively tracing static method calls made from the constructor, and
dynamic method calls are declared illegal.

2. The computer memory of claim 1 and further comprising providing the immutable type with a field that is not written to once an object on which the field resides has been fully constructed.

3. The computer memory of claim 2 and further comprising supporting a variable assignment that occurs as part of the declaration or in a static constructor in a same class.

4. The computer memory of claim 2 wherein the providing and supporting are included with a readonly keyword in C# programming language.

5. The computer memory of claim 2 wherein the field that is not written to includes variable assignment that occurs as part of the declaration or in a static constructor in a same class.

6. The computer memory of claim 1 including at least two of the plurality of types are immutable types, wherein one of the immutable types is used as a field in the other of the immutable types.

7. The computer memory of claim 6 wherein the plurality of types can include a derived type from a base type.

8. The computer memory of claim 7 wherein the plurality of types further includes at least one mutable types, and wherein the immutable types do not derive from the at least mutable types.

9. The computer memory of claim 7 wherein at least some of base types are immutability transparent types.

10. The computer memory of claim 9 wherein immutability transparent types are not immutable but have observable immutability.

11. The computer memory of claim 9 wherein the immutability transparent types are objects.

12. The computer memory of claim 7 wherein immutability of the derived type is not affected with mutations of the base type.

13. The computer memory of claim 7 wherein the derived type does not override virtual members and does not access fields of the base type.

14. The computer memory of claim 13 including eliminating virtual members.

15. The computer memory of claim 13 wherein the immutable types are sealed to prevent outside classes from breaking up code that is used for making a type immutable.

16. A computer readable storage medium storing computer executable instructions for controlling a computing device to perform a method comprising:
defining an imperative framework having a plurality of types including defined immutable types, wherein all post-construction changes to objects of the defined immutable types are not possible, and mutable types, wherein post-construction changes to objects of the mutable types are possible, within the imperative framework, wherein the types include fields; and
verifying immutability of immutable types with a group of rules comprising:
fields of immutable types are not written to once an object on which the field resides has been fully constructed;
variable assignments of fields of the immutable type are initonly and only occur as part of a declaration or in a static constructor of the same class;
types used as fields in the immutable type are also immutable such that immutable types do not derive from mutable types wherein the immutability of a derived type is not affected with mutations of the base type, subjected to the conditions of,
the immutable type does not override virtual members and does not access fields from a base type, and
base types can be immutability transparent;
immutable types that share a 'this' reference prior to complete construction are declared illegal and are verified by at least one of:
stores and aliasing of the 'this' reference are declared illegal,
analyzing code for aliasing of the 'this' reference,
recursively tracing static method calls made from the constructor, and
dynamic method calls are declared illegal; and
generic type constraints can specify immutability.

17. The computer memory of claim 16 wherein the group of rules further comprises types used in fields of immutable types are immutable.

18. The computer memory of claim 17 where the group of rules further include immutability of a derived type is not affected by mutations of a related base type.

19. The computer memory of claim 18 wherein the rule of immutability of a derived type is not affected by mutations of a related base type includes a subgroup of rules comprising at least one of:
immutable types can not derive from mutability types;
mutable types can not derive from immutable types; and
base types can be types that do not require that all subclasses of the type are immutable and where the base type does not include observable immutability.

20. A system, comprising:
a computing device; and
an imperative framework operably coupled to the computing device, wherein the imperative framework includes an imperative language having a plurality of types such that at least one of the plurality of types is a defined immutable type wherein all post-construction changes to objects of the immutable type is not possible and the immutable type includes at least one immutable field; and
a type verification system, configured to verify the immutable type within the imperative framework, with a plurality of rules including:
variable assignments of fields of the immutable type are initonly and only occur as part of a declaration or in a static constructor of the same class;
types used as fields in the immutable type are also immutable such that immutable types do not derive from mutable types wherein the immutability of a derived type is not affected with mutations of the base type, subjected to the conditions of,
immutable types do not derive from mutable types,
the immutable type does not override virtual members and does not access fields from a base type, and
base types can be immutability transparent;
mutable types do not derive from immutable types; and
immutable types do not share a 'this' reference during construction verified by at least one of:
stores and aliasing of the 'this' reference are declared illegal,
analyzing code for aliasing of the 'this' reference, recursively tracing static method calls made from the constructor, and
dynamic method calls are declared illegal.

\* \* \* \* \*